Aug. 9, 1960 T. H. GLASSER ET AL 2,948,506
DAMPING TURBINE BUCKETS
Filed Sept. 18, 1958 2 Sheets-Sheet 1

Inventors:
Thomas H. Glasser,
Robert V. Klint,
by Paul A. Frank
Their Attorney.

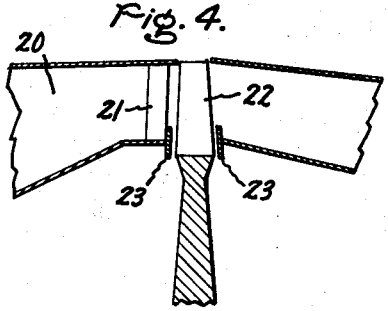
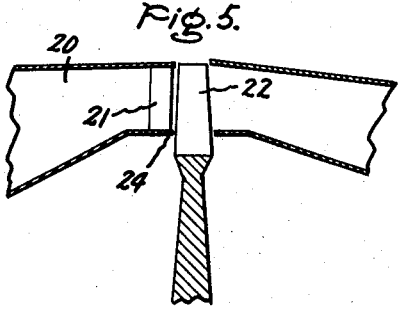
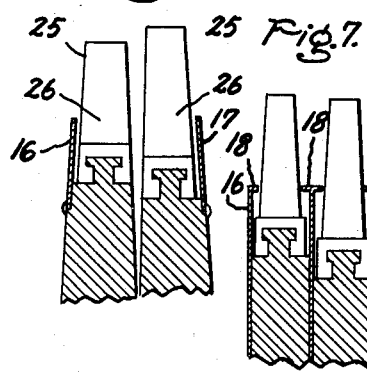
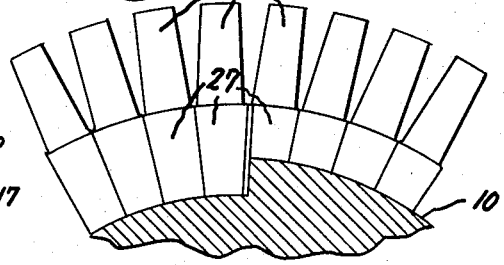
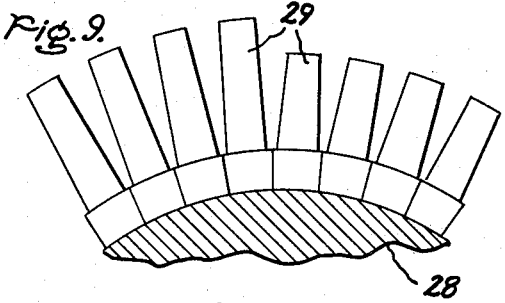
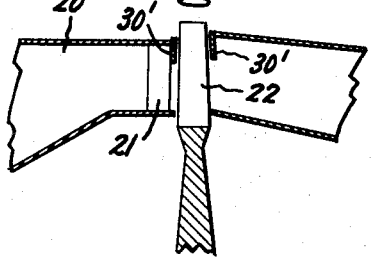
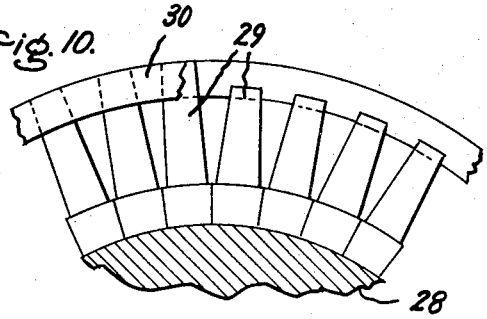
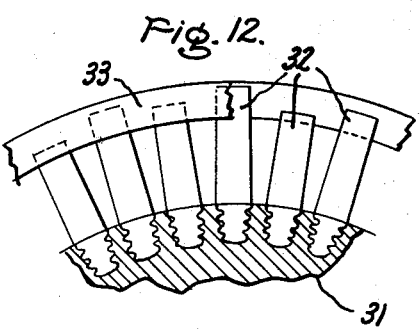
Inventors:
Thomas H. Glasser,
Robert V. Klint,
by Richard R. Brainard
Their Attorney.

United States Patent Office 2,948,506
Patented Aug. 9, 1960

2,948,506

DAMPING TURBINE BUCKETS

Thomas H. Glasser, Ballston Lake, and Robert V. Klint, Rexford, N.Y., assignors to General Electric Company, a corporation of New York Filed Sept. 18, 1958, Ser. No. 762,200

16 Claims. (Cl. 253—77)

This invention relates to elastic fluid turbines and more specifically to vibration damping of buckets which are used in such turbines. This application is a continuation-in-part of our copending application, Serial No. 440,034, filed June 29, 1954, now abandoned, and assigned to the same assignee as the present invention.

A serious problem in elastic fluid turbines and compressors is the tendency of buckets to fracture when they are subjected to a vibrational stress at or near resonant frequency. Elastic fluid turbines are operated under conditions of frequent acceleration and deceleration in many installations. During such periods, the turbine buckets are momentarily, or for relatively short periods of time, subjected to vibrational stresses at their fundamental resonant frequency or at higher resonant frequencies. Thus, the amplitude of vibrations of a bucket can build up readily to where fatigue fractures occur. Such fractures have occurred in very tough and heat-stable metals or alloys from which turbine buckets are fabricated.

The buckets, which are most prone to fracture, are rigidly positioned in the turbine rotor. The presence of a slight vibration fracture results in a damping effect which helps to safeguard the bucket from further vibrational deterioration. However, this protection does not prevent additional slow progress of the fracture which decreases the efficiency of energy conversion and unbalances the rotor. It is desirable to damp turbine buckets to resist the fracturing effect of a vibrational stress at or near the resonant frequency vibration of the bucket.

Accordingly, it is an object of our invention to provide a new and improved bucket assembly for an elastic fluid turbine.

It is another object to the invention to provide a turbine bucket assembly which will resist bucket fracture when a vibration stimulus is applied thereto.

It is further object of the invention to provide a turbine bucket assembly which utilizes buckets of various lengths.

It is another object of the invention to provide a turbine bucket assembly which utilizes an eccentric rotor.

In carrying out our invention in one form a plurality of turbine buckets of various lengths are mounted on an eccentric hub or wheel disc to provide a turbine bucket assembly.

These and various other objects, features, and advantages will be better understood from the following description taken in connection with the accompanying drawing in which:

Fig. 4 illustrates a shroud attached to a related part of the turbine wheel assembly;

Fig. 5 illustrates a modification of the shroud of Fig. 4;

Fig. 6 illustrates the shrouding of Fig. 2 applied to a multi stage turbine;

Fig. 7 illustrates the shroud of Fig. 3 applied to a multi stage turbine;

Fig. 8 illustrates a modified form of the invention wherein the bucket bases have different lengths;

Fig. 9 illustrates a modification of the invention wherein buckets of different length are applied to a circular hub or wheel disc;

Fig. 10 illustrates a bucket mounted shroud for the hub or wheel disc;

Fig. 11 illustrates a shroud attached to related parts for the hub or wheel disc of Fig. 10.

Fig. 12 illustrates a modification of this invention of buckets of unequal lengths randomly dispersed about a hub or wheel disc.

Figure 1:
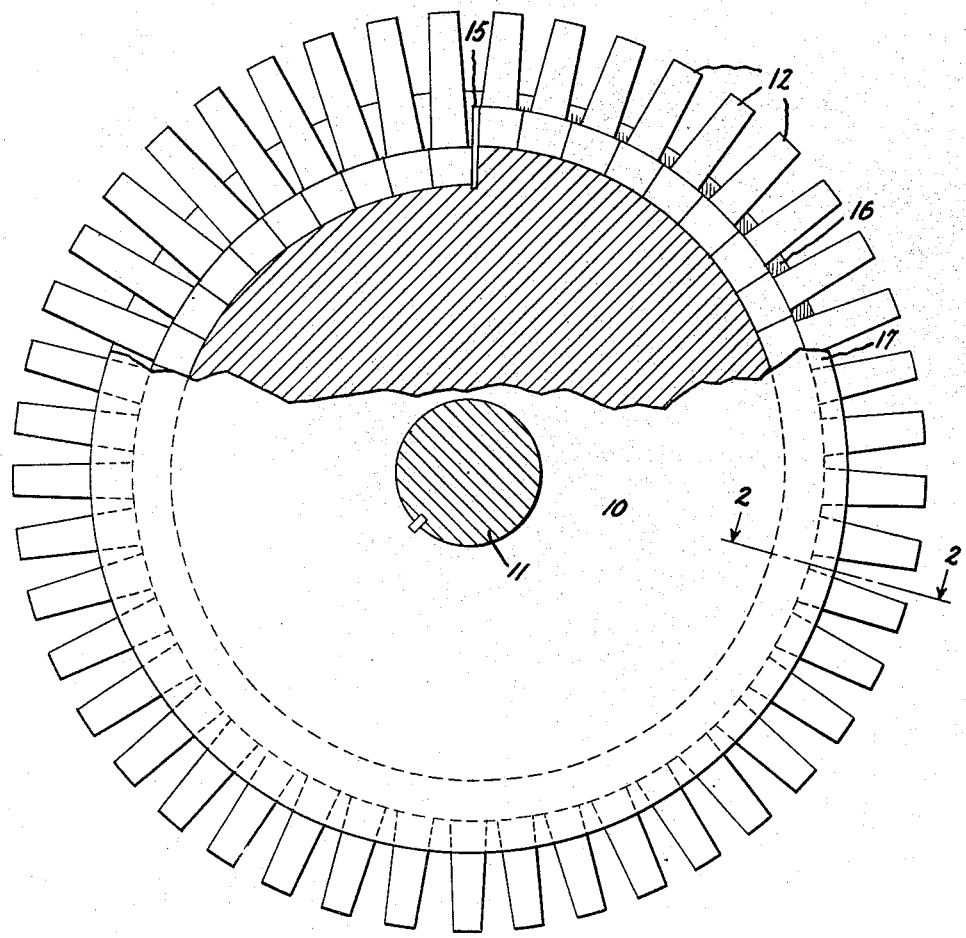
Fig. 1 is an axial view of an embodiment of our invention as applied to a turbine bucket assembly structure.

In Fig. 1, a turbine bucket assembly structure is shown which comprises an eccentric hub or disk 10 with a non-circular or irregular periphery mounted on a shaft 11. This eccentricity may be further described as a hub whose radius proportionately decreases about the circumference thereof. A plurality of turbine buckets 12 of various lengths are mounted uniformly in a circumferential row around the periphery of hub 10 so that the tips of the buckets are equidistant from the center of shaft 11. Since the buckets are of various lengths, each bucket will have a different natural frequency of vibration from the other or remaining buckets, and more specifically, in any group of adjacent buckets, a bucket from that group will have a different natural frequency of vibration and length from any other bucket from a plurality of preceding adjacent or subsequent adjacent buckets. While conventional outside hook mountings 13 are employed to position buckets 12 on a peripheral flange 14 on hub 10, it is obvious that many other types of mountings, such as, for example, a dovetail-type, would be entirely satisfactory. A retaining member 15 is provided between the first and last buckets to secure the bucket assembly in position. If it is desired, a plurality of dovetail-type buckets of various lengths may be mounted uniformly around the periphery of a hub so that the tips of the buckets are equidistant from the center of the hub shaft. The word "bucket" is intended to include a base and a blade portion.

Figure 2:
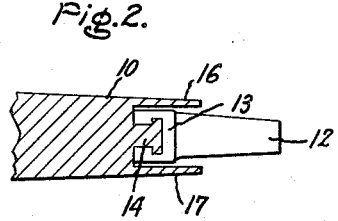
Fig. 2 is a sectional view which is taken along lines 2—2 of Fig. 1.

As is best shown in Fig. 2, a pair of shrouds 16 and 17 are formed as an integral part of hub 10 to provide uniform exposure of buckets 12 to an elastic fluid stream. Shrouds 16 and 17 may be also welded or secured otherwise to hub 10 to facilitate the replacement of buckets 12. Buckets 12 are applied tangentially to hub 10 by means of their mountings 13 which fit peripheral flange 14 of the hub. After buckets 12 are applied to hub 10, retaining member 15 is positioned between the first and last buckets to further secure the bucket assembly.

In the operation of the turbine bucket assembly structure in Fig. 1, the buckets vibrate at appreciably different predetermined natural frequencies from one another. The natural frequencies of the buckets must be kept sufficiently different to prevent a coupled synchronism of the vibrations. These differences in natural frequencies are determined by the length of each of the buckets. When a bucket receives a pulse, the vibration is transmitted to a damping bearing on shaft 11 upon which hub 10 is mounted or other vibration damper (not shown). The unbalance of vibration of the detuned bucket is removed in this vibration damper. Thus, vibratory energy, which causes fatigue failure, is dissipated and the amplitude of vibration of the buckets is reduced. Shrouds 16 and 17 provide a uniform exposure of buckets 12 to the elastic fluid stream since buckets of various lengths are mounted on an eccentric hub.

Figure 3:
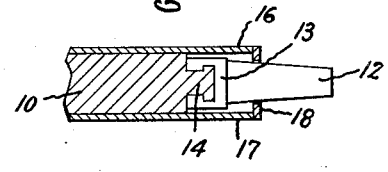
Fig. 3 is a sectional view of a modified turbine bucket assembly structure.

In Fig. 3, an annular shoud 18 is secured to shrouds 16 and 17 by suitable means, such as, for example, by welding. Shroud 18 prevents contact of a hot gas stream in the turbine with hub 10 and mountings 13. The energy of the gas stream is conserved by shroud 18 which may also provide a secondary damping effect by rubbing against buckets 12.

Shroud members 16, 17, and 18 as illustrated in Figs. 1–3 need not be mounted on or secured directly to the hub 10. It is evident that these members may also be or affixed to a stationary part or related equipment to be adjacent to or otherwise associated with hub 10. In Fig. 4, for example, there is shown a partial view of a turbine wheel assembly and related equipment, in accordance of the teaching of this invention, where combustion gases or elastic fluid proceeds through annular passage 20, between guide members 21, and thence through blade portions 22 of turbine buckets 12. Suitable shrouding for uniform exposure to the elastic fluid stream is provided by means of a stationary member or members 23. In Fig. 5, the shroud is in the form of a lip extension 24 of the lower surface of annular passage 20.

Figs. 6 and 7 are illustrations of the invention disclosed in Figs. 1–3 as applied to multi-stage turbines where the individual turbine hubs or wheels are either of the integral, single hub or wheel, or multiple hub or wheel type. In multi stage turbines, it is understood that various forms of shrouding may be employed, to obtain the most advantageous results, in addition to those illustrated, and combinations thereof. In a preferred form of this invention, the shrouds 16, 17, and 18 are secured to the turbine hub by external means, for example, by welding, riveting, and the like, rather than being an integral part of the hub 10. Figs. 6 and 7 provide a basis for the many and various forms of "boxing in" those portions of the bucket not necessary to provide a uniform exposure to an elastic fluid stream. Balancing may be facilitated in multi stage wheels where several wheels are joined together by offsetting the individual hubs circumferentially.

Referring again to Figs. 6 and 7, it may be seen that the blade portions 25 of the buckets 12 that are provided with the shroud members or are otherwise "boxed in" to have a uniform exposure to the elastic fluid stream, are of the same airfoil section, that is, the elastic fluid stream exerts the same force on all blades of like airfoil shape. In this respect, therefore, it is not necessary to employ the costly machining or forging operations on the blade portions 25 of buckets 12 which are shielded from the elastic fluid stream by shrouds as illustrated in Figs. 1–7. These shrouded portions 26 as illustrated in Figs. 6 and 7 then may be a part of the base portion of the bucket to provide inherent shrouding. An example of this form of the invention is given in Fig. 8 where buckets 12 include base portions 27 of varying or different lengths. Best results are obtained, however, when the mass of the base portion and the blade portion of individual buckets are similar in mass. Otherwise, where the base portion is of a much greater mass than the blade portion a condition may occur where the blade element may vibrate either independently or at a quite different natural frequency vibration than the base portion.

In some applications it may be more desirable or expedient to employ a noneccentric or true circle hub. In this respect, the periphery of buckets 12 will then be eccentric. This form of the invention is illustrated in a partial view in Fig. 9 where wheel or hub 28 has buckets 29 of unequal length mounted thereon. Shrouding for this application may include various forms in addition to those described but positioned at the periphery of buckets 29 as indicated by the annular enclosure 30 in Fig. 10, or as a stationary element on related equipment as indicated by 30' in Fig. 11.

It is understood that the buckets in this invention are of the same material and density so that different length buckets provide different natural frequencies of vibration. However, these buckets need not be progressively of different lengths but may be mixed, randomly placed or in groups. For example, in Fig. 12 there is shown a hub 31 having buckets 32 of unequal length randomly mounted on the periphery thereof and employed together with a suitable shroud element 33.

As will be apparent to those skilled in the art, the objects of our invention are attained by the use of a plurality of turbine buckets of various lengths which are mounted on a hub to provide a turbine bucket assembly.

While other modifications of this invention and variations of apparatus which may be employed within the scope of the invention have not been described, the invention is intended to include all such as may be embraced within the following claims.

What we claim as new and desire to secure by Letters Patent of the United States is:

1. An elastic fluid machine comprising in combination, a hub, a plurality of buckets having base and blade portions and mounted in a circumferential row in a common plane on said hub, each of said buckets being of a predetermined different length and a corresponding different natural period of vibration from any bucket of a plurality of preceding adjacent and subsequent adjacent buckets to minimize vibration coupling between said buckets, and means providing a uniform exposure of said buckets to the fluid stream of said machine.

2. The invention as described in claim 1 wherein said different length refers to the blade portion of said buckets.

3. The invention as described in claim 1 wherein said different length refers to the base portion of said buckets.

4. The invention as described in claim 1 wherein said machine is multi staged to include a plurailty of said circumferential rows of buckets on said hub.

5. The invention as described in claim 1 wherein the said hub is eccentric, the radius of which decreases proportionately about the circumference thereof.

6. An elastic fluid machine comprising in combination an eccentric hub whose radius decreases proportionately about the circumference thereof, a plurality of buckets having base and blade portions and mounted in a circumferential row in a common plane on said hub, each of said buckets of a different length and a corresponding different natural frequency vibration, said buckets mounted on said hub in progressively increasing lengths as the periphery of the hub progressively decreases in radius to provide a circular bucket periphery, and means adjacent said buckets providing a uniform exposure thereof to the the fluid stream of said machine.

7. The invention as described in claim 6 wherein the said different length refers to the blade portion of said buckets.

8. The invention as described in claim 6 wherein said machine includes a multi stage hub.

9. The invention as described in claim 8 wherein said elastic fluid machine includes a plurality of eccentric hubs one of which is circumferentially offset relative to another.

10. An elastic fluid machine comprising in combination an eccentric hub whose radius decreases proportionately about the periphery thereof, a plurality of buckets mounted in a circumferential row in a common plane on said hub, each of said buckets having a base portion of different length to provide different natural periods of vibration, said buckets being positioned on said hub with bases of progressively increasing length as the periphery of the rotor decreases in radius such that a uniform exposure to the fluid stream is provided for said buckets.

11. An elastic fluid machine comprising in combination, a circular hub, a plurality of buckets mounted in a circumferential row in a common plane on said hub, each of said buckets being of a predetermined different length and a corresponding different natural period of vibration, said buckets being randomly mounted upon the periphery of said hub with respect to the varying length, and shroud means adjacent said hub to provide a uniform exposure of said buckets to the fluid stream of said machine.

12. In a fluid machine, an ececntric hub, a plurality of buckets mounted in a circumferential row in a common plane on said hub, each of said buckets of a different length, and a shroud mounted on said hub, said shroud spaced equidistantly from the tip of each said buckets to provide uniform exposure of said buckets to a fluid stream.

13. In a fluid machine, an eccentric hub, a plurality of buckets mounted in a circumferential row on said hub, each of said buckets of a different length, and a pair of shrouds mounted on said hub, said shrouds spaced equidistantly from the tip of each of said buckets to provide uniform exposure of said buckets to a fluid stream.

14. In a fluid machine, an eccentric hub, a plurality of buckets mounted in a circumferential row on said hub, each of said buckets of a progressively increased length, and a pair of shrouds mounted on said hub, said shrouds spaced equidistantly from the tip of each of said buckets to provide a uniform exposure of said buckets to a fluid stream.

15. In a fluid machine the combination which comprises, an eccentric hub, a circumferential row of buckets mounted on said hub in a common plane, each of said buckets of a predetermined different length to prevent vibration coupling between blades, and a shroud associated with said blades to provide uniform exposure of said blades to a fluid stream.

16. An elastic fluid machine comprising in combination, a hub, a plurality of buckets having base and blade portions mounted in a circumferential row in a common plane on said hub, each of said buckets being of a predetermined different length and a corresponding different natural period of vibration from any other bucket in said row to minimize vibration coupling between said buckets, and means providing a uniform exposure of said buckets through the fluid stream of said machine.

References Cited in the file of this patent

UNITED STATES PATENTS

| | | |
|---|---|---|
| 578,509 | Drayton | Mar. 9, 1897 |
| 1,639,247 | Zoelly et al. | Aug. 16, 1927 |
| 2,432,315 | Howard | Dec. 9, 1947 |
| 2,478,602 | Stein | Aug. 9, 1949 |
| 2,687,013 | Sinclair | Aug. 24, 1954 |

FOREIGN PATENTS

| | | |
|---|---|---|
| 166,859 | Great Britain | July 28, 1921 |
| 189,131 | Great Britain | Mar. 1, 1923 |
| 312,011 | Switzerland | Feb. 15, 1956 |
| 462,607 | France | Nov. 26, 1913 |